(12) United States Patent
Prakash et al.

(10) Patent No.: US 8,391,192 B2
(45) Date of Patent: Mar. 5, 2013

(54) CARRIER SWITCHING IN A MULTI-CARRIER WIRELESS COMMUNICATION NETWORK

(75) Inventors: Rajat Prakash, La Jolla, CA (US); Aamod Khandekar, San Diego, CA (US); Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 794 days.

(21) Appl. No.: 12/119,979

(22) Filed: May 13, 2008

(65) Prior Publication Data
US 2008/0316969 A1    Dec. 25, 2008

Related U.S. Application Data

(60) Provisional application No. 60/917,926, filed on May 14, 2007.

(51) Int. Cl.
*H04B 7/00* (2006.01)
(52) U.S. Cl. ............................................ 370/310
(58) Field of Classification Search .................... None
See application file for complete search history.

(56) References Cited

U.S. PATENT DOCUMENTS

| | | | |
|---|---|---|---|
| 6,181,943 B1 | 1/2001 | Kuo et al. | |
| 6,611,506 B1 * | 8/2003 | Huang et al. | 370/329 |
| 7,136,647 B2 | 11/2006 | Huang et al. | |
| 7,453,912 B2 * | 11/2008 | Laroia et al. | 370/526 |
| 7,577,118 B2 * | 8/2009 | Haumonte et al. | 370/330 |
| 7,668,518 B2 * | 2/2010 | Chen | 455/166.2 |
| 2004/0106407 A1 | 6/2004 | Kikuma et al. | |
| 2004/0157561 A1 * | 8/2004 | Akerberg | 455/67.11 |
| 2005/0233746 A1 * | 10/2005 | Laroia et al. | 455/436 |
| 2007/0091844 A1 | 4/2007 | Huang et al. | |
| 2007/0104140 A1 * | 5/2007 | Ashish et al. | 370/329 |

FOREIGN PATENT DOCUMENTS

CN    1474527 A    2/2004

(Continued)

OTHER PUBLICATIONS

"Radio Resource Control (RRC); Protocol specification", 3GPP TS 25.331 V7.7.0 (Dec. 2007) Section 14.2.1.2.

(Continued)

*Primary Examiner* — Chi Pham
*Assistant Examiner* — Fan Ng
(74) *Attorney, Agent, or Firm* — Donald C. Kordich

(57) ABSTRACT

Techniques for performing carrier switching in a multi-carrier access network are described. A terminal may be assigned to a carrier among multiple carriers having different transmit power levels, e.g., by the access network during system access or handoff. The terminal may receive a switch threshold from the access network. The terminal may periodically measure the received signal strength of the assigned carrier and may compare the received signal strength against the switch threshold. The terminal may refrain from switching to a stronger carrier if the received signal strength exceeds the switch threshold and may switch to the stronger carrier if the received signal strength is below the switch threshold. This carrier switching scheme may prevent the terminal from switching to the strongest carrier when the assigned carrier can provide satisfactory performance. The access network may also switch the terminal to another carrier by sending a carrier switch message.

36 Claims, 5 Drawing Sheets

FOREIGN PATENT DOCUMENTS

| | | |
|---|---|---|
| EP | 0948231 | 10/1999 |
| EP | 0984650 A2 | 3/2000 |
| JP | 11331912 A | 11/1999 |
| JP | 2000092557 A | 3/2000 |
| JP | 2000224650 A | 8/2000 |
| JP | 2003153335 A | 5/2003 |
| JP | 2004048527 A | 2/2004 |
| JP | 2006526313 A | 11/2006 |
| JP | 2007124622 A | 5/2007 |
| RU | 2212119 | 9/2003 |
| TW | 421936 B | 2/2001 |
| WO | WO9913675 A1 | 3/1999 |

OTHER PUBLICATIONS

International Search Report—PCT/US08/063793—International Search Authority—European Patent Office—Sep. 19, 2008.

Written Opinion—PCT/US08/063793—International Search Authority—European Patent Office, Munich—Sep. 19, 2008.

International Search Report and Written Opinion—PCT/US2010/052544, ISA/EPO—Jul. 15, 2011.

Taiwan Search Report—TW097117731—TIPO—Dec. 26, 2011.

* cited by examiner

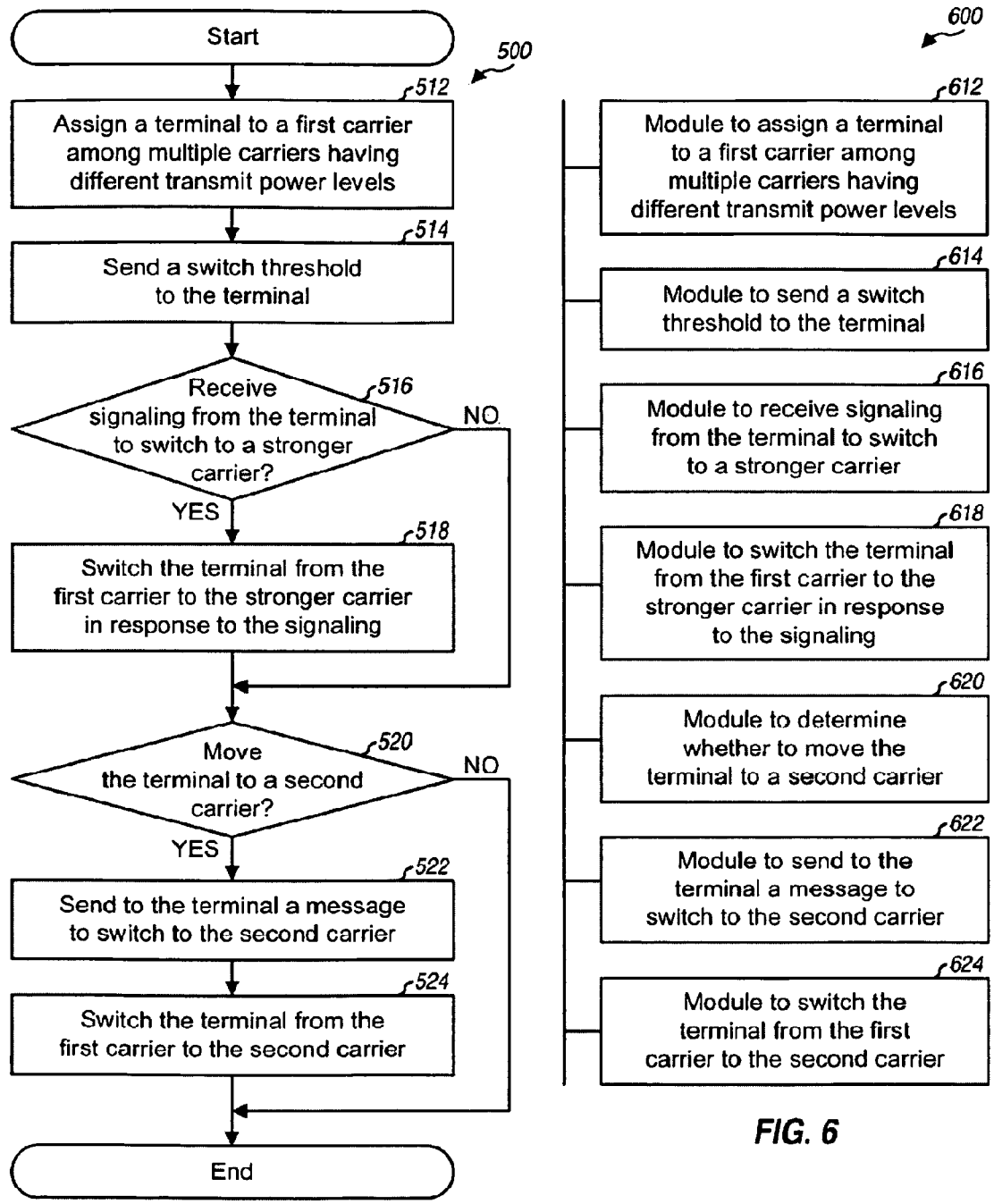

CARRIER SWITCHING IN A MULTI-CARRIER WIRELESS COMMUNICATION NETWORK

The present application claims priority to provisional U.S. Application Ser. No. 60/917,926, entitled "RATE PREDICTION IN FRACTIONAL REUSE SYSTEMS," filed May 14, 2007, assigned to the assignee hereof and incorporated herein by reference.

BACKGROUND

I. Field

The present disclosure relates generally to communication, and more specifically to techniques for operating a terminal in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. A wireless communication network may also be referred to as an access network (AN), a radio access network (RAN), a radio network (RN), etc.

An access network may be a multi-carrier network that supports operation on multiple carriers. A carrier may refer to a range of frequencies used for communication or a transmission on the range of frequencies. A carrier may also be referred to as a frequency channel, a radio frequency (RF) channel, a CDMA channel, etc. A base station may transmit data on multiple carriers to a number of terminals and may use different transmit power levels for different carriers. It is desirable for each terminal to operate on a suitable carrier such that good performance can be achieved for all terminals.

SUMMARY

Techniques for performing carrier switching in a multi-carrier access network are described herein. A terminal may be assigned to a carrier among multiple carriers having different transmit power levels, e.g., by the access network during system access or handoff. The terminal may receive a switch threshold from the access network. The terminal may periodically measure the received signal strength of the assigned carrier and may compare the received signal strength against the switch threshold. The terminal may refrain from switching to a stronger carrier if the received signal strength of the assigned carrier exceeds the switch threshold. The terminal may switch to the stronger carrier if the received signal strength of the assigned carrier is below the switch threshold. This carrier switching scheme may prevent the terminal from switching to the strongest carrier when the assigned carrier can provide satisfactory performance.

The terminal may perform mobile-initiated handoff and autonomously switch to a stronger carrier if the received signal strength of the assigned carrier drops below the switch threshold. The access network may control mobile-initiated handoff with the switch threshold in order to mitigate performance degradation to other terminals assigned to strong carriers. The access network may also perform network-initiated handoff and switch the terminal to another carrier by sending a carrier switch message to the terminal. The access network may perform network-initiated handoff to balance the load on different carriers and/or to ensure adequate quality of service (QoS) for the terminal.

Various aspects and features of the disclosure are described in further detail below.

BRIEF DESCRIPTION OF THE DRAWINGS

FIG. 5 shows a process for supporting carrier switching by an access network.

FIG. 6 shows an apparatus for supporting carrier switching.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as cdma2000, Universal Terrestrial Radio Access (UTRA), etc. cdma2000 covers IS-2000, IS-95 and IS-856 standards. UTRA includes Wideband-CDMA (WCDMA) and other variants of CDMA. A TDMA network may implement a radio technology such as Global System for Mobile Communications (GSM). An OFDMA network may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the forward link and SC-FDMA on the reverse link. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for UMB, and UMB terminology is used in much of the description below UMB is described in 3GPP2 C.S0084-001, entitled "Physical Layer for Ultra Mobile Broadband (UMB) Air Interface Specification," August 2007, which is publicly available.

Figure 1:
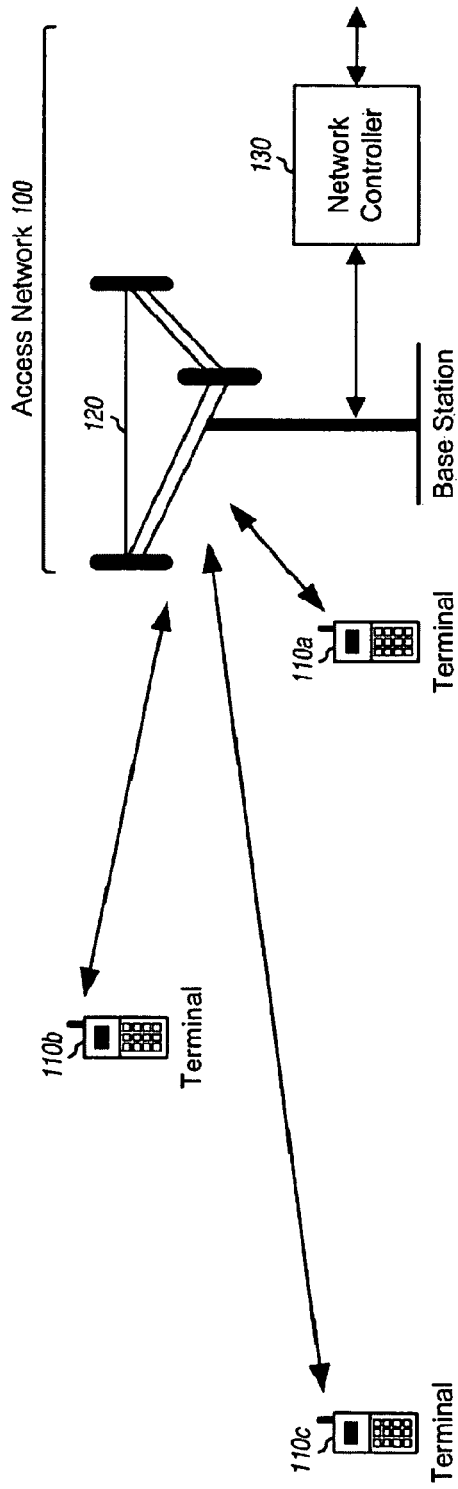
FIG. 1 shows an access network.

FIG. 1 shows an access network (AN) 100, which may include any number of base stations, network controllers, and other network entities. For simplicity, only one base station 120 and one network controller 130 are shown in FIG. 1. A base station is generally a fixed station that communicates with the terminals and may also be referred to as an access point, a Node B, an evolved Node B, etc. A base station provides communication coverage for a particular geographic area. To improve capacity, the overall coverage area of a base station may be partitioned into multiple (e.g., three) smaller areas. In 3GPP, the term "cell" can refer to the smallest coverage area of a base station and/or a base station subsystem serving this coverage area. In 3GPP2, the term "sector" can refer to the smallest coverage area of a base station and/or a base station subsystem serving this coverage area. For clarity, 3GPP2 concept of sector is used in the description below.

Network controller 130 may couple to a set of base stations, provide coordination and control for the base stations under its control, and route data for terminals served by these base stations. Access network 100 may include other network entities not shown in FIG. 1.

Terminals 110 may communicate with access network 100 to obtain communication services. A terminal may be stationary or mobile and may also be referred to as an access terminal (AT), a mobile station, a user equipment, a subscriber unit, a station, etc. A terminal may be a cellular phone, a personal digital assistant (PDA), a wireless modem, a handheld device, a laptop computer, etc. A terminal may communicate with a base station via the forward and reverse links. The forward link (or downlink) refers to the communication link from the base station to the terminal, and the reverse link (or uplink) refers to the communication link from the terminal to the base station. The terms "terminal" and "user" are used interchangeably herein.

The access network may support operation on multiple carriers for the forward link and/or reverse link. A base station may transmit data via multiple carriers on the forward link to the terminals. The terminals may transmit data via multiple carriers on the reverse link to the base station. Multi-carrier operation may be supported in various manners.

Figure 2:
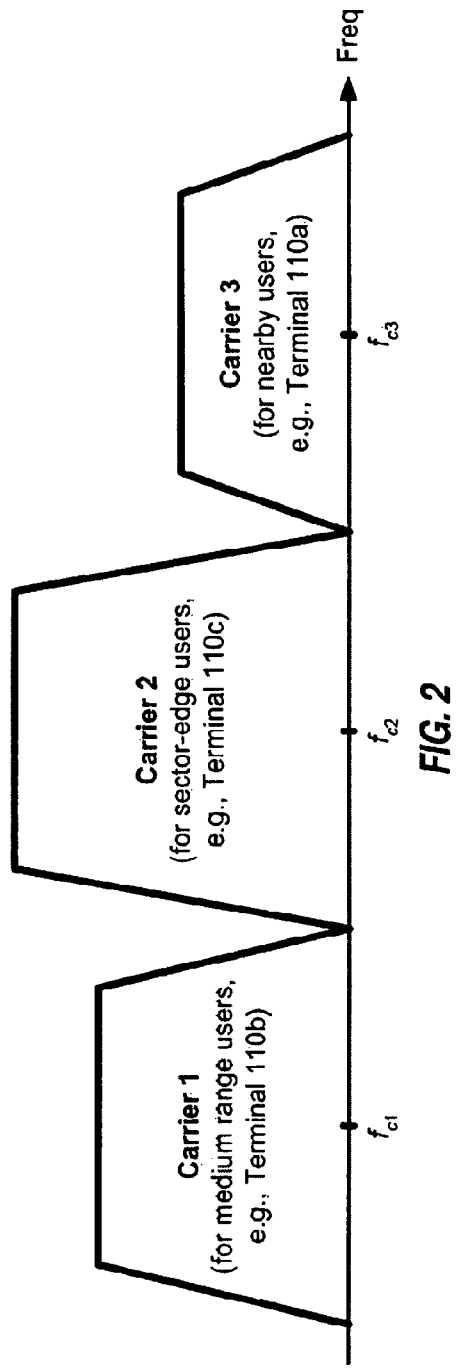
FIG. 2 shows transmission of three carriers on the forward link.

FIG. 2 shows an example transmission of three carriers on the forward link for multi-carrier operation. Each carrier may have a bandwidth of $f_{BW}$, which may be a fixed or configurable value. Carrier 1 has a center frequency of $f_{c1}$, carrier 2 has a center frequency of $f_{c2}$, and carrier 3 has a center frequency of $f_{c3}$. The center frequencies may be selected such that the carriers are spaced sufficiently far apart to reduce inter-carrier interference. In general, N carriers may be supported for a given link, where N may be any integer value. The N carriers may have the came or different bandwidths and may be centered at frequencies separated by suitable amounts.

Base station 120 may transmit N forward link signals on the N carriers. Each forward link signal may carry traffic data, signaling, and pilot for a set of terminals. Different terminals may be at different locations throughout the access network and may observe different channel conditions. In one design, the terminals may be assigned to different carriers based on their channel conditions. For example, terminals located near the base station may be assigned to one carrier (e.g., carrier 3 in FIG. 2), terminals located in the middle of the cell may be assigned to another carrier (e.g., carrier 1 in FIG. 2), and terminals located at the sector edge may be assigned to yet another carrier (e.g., carrier 2 in FIG. 2). The base station may use different transmit power levels or settings for different carriers, as shown in FIG. 2. For example, the base station may use high power for carrier 2 for the sector-edge terminals, medium power for carrier 1 for the medium range terminals, and low power for carrier 3 for the nearby terminals. Since path loss is generally greater for larger distance from the base station, this transmission scheme may ensure that the terminals located throughout the sector can all achieve good performance even though they may have different path losses.

A terminal may desire to access the access network and may measure the received signal strength of each of the N carriers. Received signal strength is indicative of the strength of a received signal or transmission and may also be referred to as received power, received strength, received signal strength indicator (RSSI), etc. Received signal quality may also be used in place of received signal strength and is indicative of the quality of a received signal or transmission. In the description herein, the term "received signal strength" can generically refer to received strength or received quality.

The terminal may send received signal strength measurements for the N carriers to the access network. The access network may assign the terminal to one of the N carriers based on various factors such as the received signal strength measurements for the N carriers, the load of each carrier, QoS and data requirements of the terminal, etc. For example, the access network may assign the terminal to a high power carrier (e.g., carrier 2) if the terminal is located far away from the base station and only the received signal strength of this carrier is sufficiently strong. The access network may assign the terminal to a low power carrier (e.g., carrier 3) if the terminal is located close to the base station and the received signal strength of this carrier is sufficiently strong. In any case, the access network may assign the terminal to an appropriate carrier during system access such that the terminal can obtain satisfactory performance. The terminal may thereafter receive data on the assigned carrier.

The access network may support handoff initiated by a terminal, which may be referred to as mobile-initiated handoff, AT-controlled handoff, etc. During normal operation, the terminal may periodically obtain received signal strength measurements for the N carriers. The terminal may then determine whether to remain on the assigned carrier, to switch to another carrier of the same base station, or to switch to another base station based on the received signal strength measurements. If the N carriers are transmitted at different power levels, e.g., as shown in FIG. 2, then the terminal may select the carrier with the strongest received signal strength. The terminal may attempt to switch to the strongest carrier even if the terminal is located close to the base station. This may result in performance degradation for the sector-edge terminals assigned to the strongest carrier.

In an aspect, a terminal is prevented from switching to a stronger carrier of the same base station if the received signal strength of the assigned carrier is above a switch threshold. This switch threshold may be referred to as an ATChannelSwitchThreshold and may be given in units of decibel (dB). The terminal may receive the switch threshold from the access network. The access network may control mobile-initiated handoff with the switch threshold in order to mitigate loss of performance to the sector-edge terminals.

In one design, the same switch threshold may be used for all N carriers. In another design, different switch thresholds may be used for different carriers. For both designs, the switch threshold for each carrier may be determined based on various factors such as QoS requirements of the terminals, data rates of the terminals, the load of each carrier, etc. The supported data rate may be dependent on the received signal strength. A higher switch threshold may allow a terminal to switch to a stronger carrier when the received signal strength of the assigned carrier is at a higher level, which may ensure that the terminal can support a higher data rate. The switch threshold may thus be selected to ensure a certain minimum data rate for the terminal during normal operation. A default value may be used for the switch threshold if one is not specified by the access network.

Figure 3:
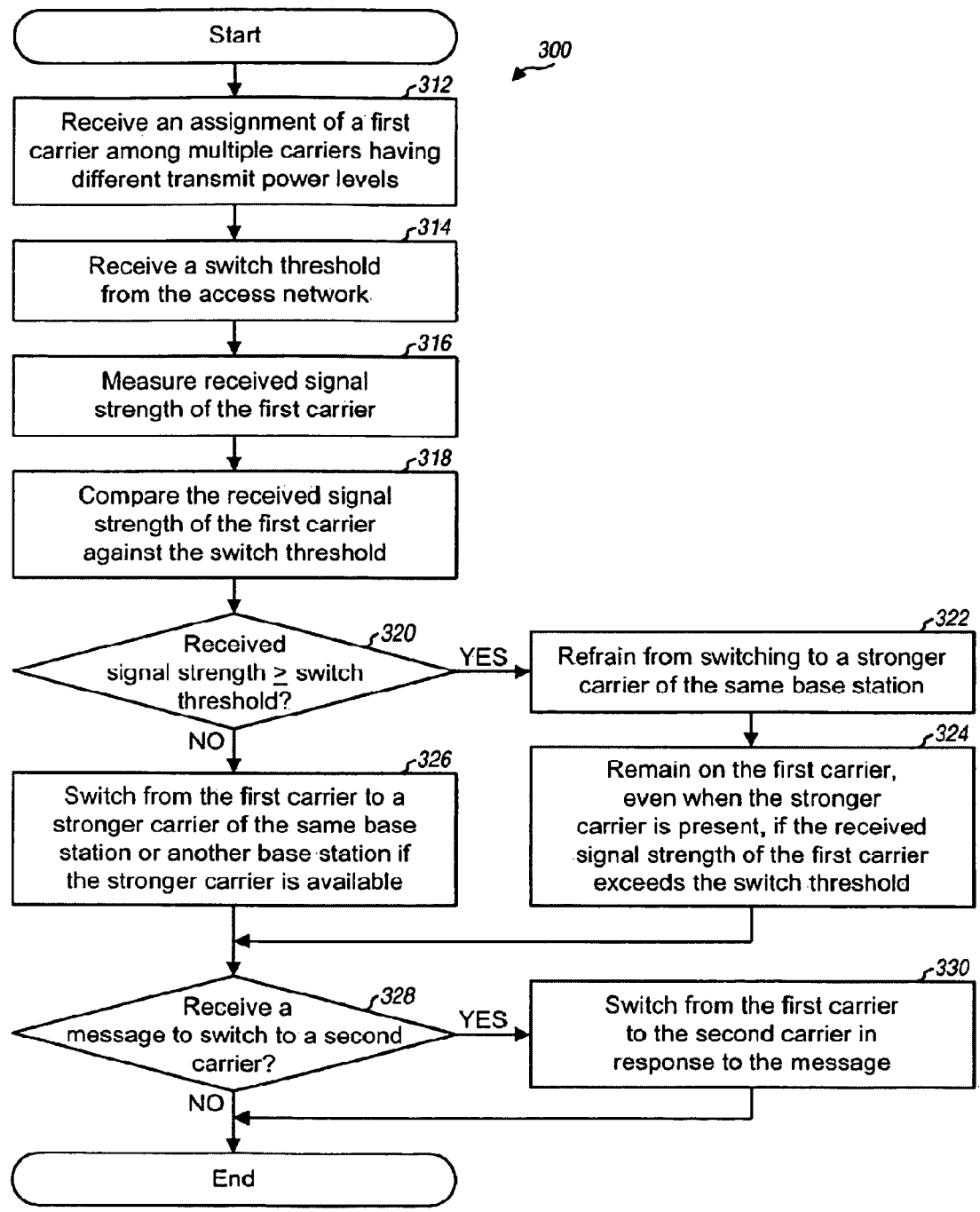
FIG. 3 shows a process for performing carrier switching by a terminal.

FIG. 3 shows a design of a process 300 for performing carrier switching by a terminal. The terminal may be assigned to a first carrier among multiple carriers having different transmit power levels, e.g., by an access network during system access or handoff (block 312). The terminal may receive a switch threshold from the access network, e.g., via a unicast message sent to the terminal or a broadcast message sent to all terminals (block 314). The switch threshold may be configurable by the access network. During normal operation, the terminal may periodically measure the received signal strength of the first carrier and possibly other carriers (block 316). For example, the terminal may measure the received power of pilot sent on the first carrier and may use the received pilot power as the received signal strength of this carrier. In general, the terminal may measure the received signal strength of a carrier based on pilot, data and/or other transmission sent on the carrier.

The terminal may compare the received signal strength of the first carrier against the switch threshold (block 318). If the received signal strength of the first carrier meets or exceeds the switch threshold, as determined in block 320, then the terminal may refrain from switching to a stronger carrier of the same base station (block 322). The terminal may remain on the first carrier, even when the stronger carrier is present, if the received signal strength of the first carrier exceeds the switch threshold (block 324). The terminal may switch to a weaker carrier that can provide satisfactory performance if certain conditions are met.

If the received signal strength of the first carrier is below the switch threshold, as determined in block 320, then the terminal may switch from the first carrier to a stronger carrier of the same base station or another base station, if the stronger carrier is available (block 326). In one design, the terminal may determine a difference between the received signal strength of the first carrier and the received signal strength of the stronger carrier. The terminal may switch from the first carrier to the stronger carrier if the difference exceeds a delta threshold. This delta threshold may be used to provide hysteresis so that the terminal does not continually switch between carriers having similar received signal strength due to fluctuations in channel conditions and/or measurement variability.

The terminal may autonomously switch to a stronger carrier if the received signal strength of the assigned carrier drops below the switch threshold. The access network may also switch the terminal to another carrier by sending a carrier switch message to the terminal. The access network may perform network-initiated handoff to balance the load of different carriers and/or to ensure adequate QoS for each terminal. If the terminal receives a carrier switch message to switch to a second carrier, as determined in block 328, then the terminal may switch from the first carrier to the second carrier in response to the message (block 330).

Figure 4:
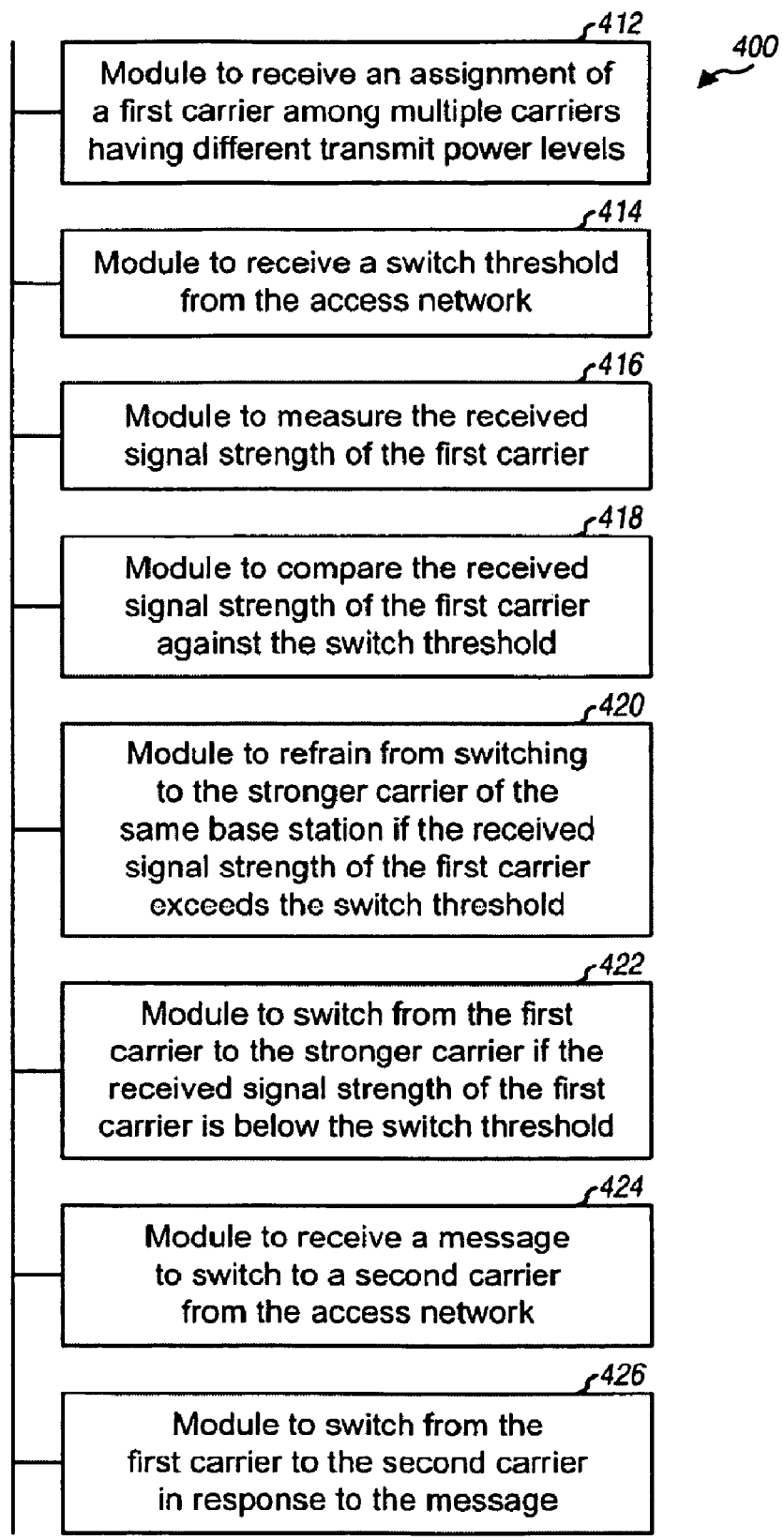
FIG. 4 shows an apparatus for performing carrier switching.

FIG. 4 shows a design of an apparatus 400 for performing carrier switching. Apparatus 400 includes a module 412 to receive an assignment of a first carrier among multiple carriers having different transmit power levels, a module 414 to receive a switch threshold from the access network, a module 416 to measure the received signal strength of the first carrier, a module 418 to compare the received signal strength of the first carrier against the switch threshold, a module 420 to refrain from switching to the stronger carrier of the same base station if the received signal strength of the first carrier exceeds the switch threshold, a module 422 to switch from the first carrier to a stronger carrier of the same base station or another base station if the received signal strength of the assigned carrier is below the switch threshold, a module 424 to receive a message to switch to a second carrier from the access network, and a module 426 to switch from the first carrier to the second carrier in response to the message.

FIG. 5 shows a design of a process 500 for supporting carrier switching. Process 500 may be performed by an access network, e.g., a base station, a network controller, and/or some other entity in the access network.

The access network may assign a terminal to a first carrier among multiple carriers having different transmit power levels, e.g., during system access or handoff (block 512). The access network may send a switch threshold to the terminal, e.g., via a unicast or broadcast message (block 514). The access network may set the switch threshold based on QoS requirements of terminals and/or other factors. The access network may determine whether signaling is received from the terminal to switch from the first carrier to a stronger carrier (block 516). The switch may be initiated by the terminal only if the received signal strength of the first carrier is below the switch threshold, which may prevent the terminal from switching to the stronger carrier when the first carrier can provide satisfactory performance. If the signaling is received from the terminal, then the access network may switch the terminal from the first career to the stronger carrier in response to the signaling (block 518).

The access network may determine whether to move the terminal from the first carrier to a second carrier, e.g., to balance the load among the multiple carriers and/or to meet QoS for the terminal (block 520). If the answer is 'Yes', then the access network may send to the terminal a message to switch to the second carrier (block 522). The access network may thereafter switch the terminal from the first carrier to the second carrier (block 524).

FIG. 6 shows a design of an apparatus 600 for supporting carrier switching. Apparatus 600 includes a module 612 to assign a terminal to a first carrier among multiple carriers having different transmit power levels, a module 614 to send a switch threshold to the terminal, a module 616 to receive signaling from the terminal to switch to a stronger carrier, a module 618 to switch the terminal from the first carrier to the stronger carrier in response to the signaling, a module 620 to determine whether to move the terminal from the first carrier to a second carrier, e.g., to balance the load among the multiple carriers and/or to meet QoS for the terminal, a module 622 to send to the terminal a message to switch to the second carrier, and a module 624 to switch the terminal from the first carrier to the second carrier.

The modules in FIGS. 4 and 6 may comprise processors, electronics devices, hardware devices, electronics components, logical circuits, memories, etc., or any combination thereof.

The techniques described herein may allow a terminal to autonomously switch to a stronger carrier if the received signal strength of the assigned carrier drops suddenly. This may enable robust operation and ensure good performance for the terminal under variable channel conditions while mitigating adverse impact to terminals on stronger carriers. Network-initiated handoff may be used for load balancing and for ensuring QoS.

Figure 7:
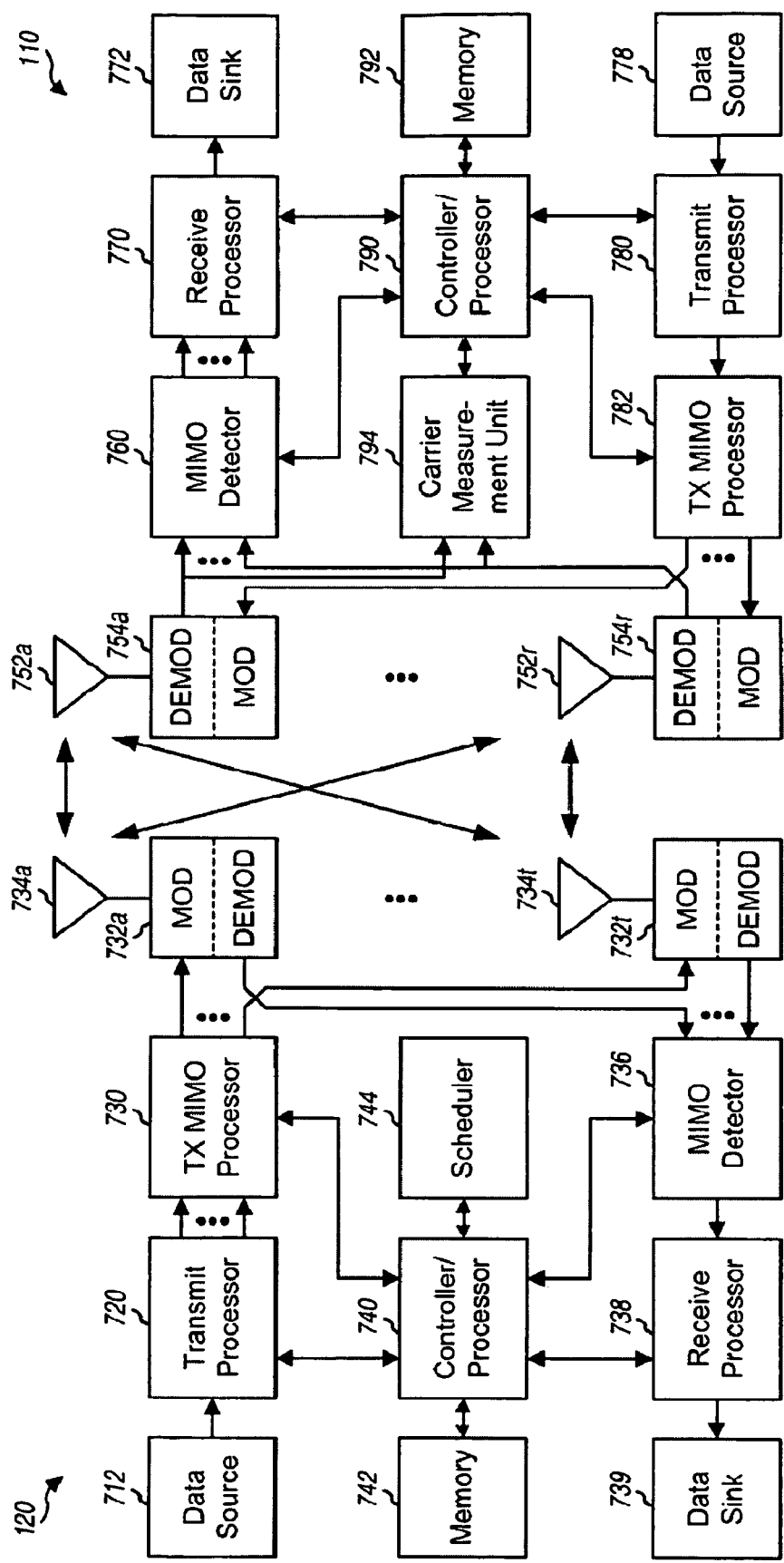
FIG. 7 shows a block diagram of a base station and a terminal.

FIG. 7 shows a block diagram of a design of base station 120 and a terminal 110, which may be one of the terminals in FIG. 1. In this design, base station 120 is equipped with T antennas 734a through 734t, and terminal 110 is equipped with R antennas 752a through 752r, where in general $T \geq 1$ and $R \geq 1$.

At base station 120, a transmit processor 720 may receive traffic data for one or more terminals from a data source 712, process the traffic data for each terminal based on one or more modulation and coding schemes selected for that terminal, and provide data symbols for all terminals. Transmit processor 720 may also receive signaling from a controller/processor 740, process the signaling, and provide signaling symbols. The signaling may comprise a switch threshold, an assignment of carrier during system access or handoff a carrier switch message, etc. Transmit processor 720 may also generate pilot symbols, which may be used to measure received signal strength. A transmit (TX) multiple-input multiple-output (MIMO) processor 730 may multiplex the data symbols, signaling symbols, and pilot symbols, perform spatial processing (e.g., preceding) on the multiplexed symbols if applicable, and provide T output symbol streams to T modulators (MODs) 732a through 732t. Each modulator 732 may process a respective output symbol stream (e.g., for OFDM) to obtain an output chip stream. Each modulator 732 may further process (e.g., convert to analog, amplify, filter, and upconvert) the output chip stream to obtain a forward link signal. T forward link signals from modulators 732a through 732t may be transmitted via T antennas 734a through 734t, respectively.

At terminal 110, antennas 752a through 752r may receive the forward link signals from base station 120 and provide received signals to demodulators (DEMODs) 754a through 754r, respectively. Each demodulator 754 may condition (e.g., filter, amplify, downconvert, and digitize) a respective received signal to obtain samples and may further process the samples (e.g., for OFDM) to obtain received symbols. A MIMO detector 760 may obtain received symbols from all R demodulators 754a through 754r, perform MIMO detection on the received symbols if applicable, and provide detected symbols. A receive processor 770 may process (e.g., demodulate, deinterleave, and decode) the detected symbols, provide decoded data for terminal 110 to a data sink 772, and provide decoded signaling to a controller/processor 790. In general, the processing by MIMO detector 760 and receive processor 770 is complementary to the processing by TX MIMO processor 730 and transmit processor 720 at base station 120.

On the reverse link, at terminal 110, traffic data from a data source 778 and signaling (e.g., to switch to a stronger carrier) from controller/processor 790 may be processed by a transmit processor 780, further processed by a TX MIMO processor 782 if applicable, conditioned by modulators 754a through 754r, and transmitted to base station 120. At base station 120, the reverse link signals from terminal 110 may be received by antennas 734, conditioned by demodulators 732, processed by a MIMO detector 736 if applicable, and further processed by a receive processor 738 to obtain the traffic data and signaling transmitted by terminal 110.

Controllers/processors 740 and 790 may direct the operation at base station 120 and terminal 110, respectively. Controller/processor 790 may perform and/or direct process 300 in FIG. 3 and/or other processes for the techniques described herein. Controller/processor 740 may perform and/or direct process 500 in FIG. 5 and/or other processes for the techniques described herein. Memories 742 and 792 may store data and program codes for base station 120 and terminal 110, respectively. A carrier measurement unit 794 may measure received signal strength of each carrier of interest and provide received signal strength measurements for all carriers to controller/processor 790. Controller/processor 790 may determine whether or not to switch carrier based on the received signal strength measurements and may initiate a switch to a stronger carrier if appropriate conditions are met, as described above. A scheduler 744 may schedule terminals for transmission on the forward link and/or reverse link and may provide assignments of resources for the scheduled terminals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of performing carrier switching, comprising:
receiving a switch threshold from an access network;
measuring received signal strength of a first carrier among multiple carriers having different transmit power levels;
comparing the received signal strength of the first carrier against the switch threshold;
determining a difference between the received signal strength of the first carrier and received signal strength of a stronger carrier if the received signal strength of the first carrier is below the switch threshold;
switching from the first carrier to the stronger carrier if the difference exceeds a delta threshold; and
refraining from switching to the stronger carrier if the received signal strength of the first carrier exceeds the switch threshold.

2. The method of claim 1, further comprising:
remaining on the first carrier, even when the stronger carrier is present, if the received signal strength of the first carrier exceeds the switch threshold.

3. The method of claim 1, further comprising:
receiving from the access network a message to switch to a second carrier; and
switching from the first carrier to the second carrier in response to the message.

4. The method of claim 1, further comprising:
receiving an assignment of the first carrier from the access network during system access or handoff.

5. The method of claim 1, wherein the switch threshold is configurable by the access network.

6. The apparatus of claim 5, wherein the at least one processor is configured to remain on the first carrier, even when the stronger carrier is present, if the received signal strength of the first carrier exceeds the switch threshold.

7. The apparatus of claim 5, wherein the at least one processor is configured to receive from the access network a message to switch to a second carrier, and to switch from the first carrier to the second carrier in response to the message.

8. The apparatus of claim 7, further comprising:
means for remaining on the first carrier, even when the stronger carrier is present, if the received signal strength of the first carrier exceeds the switch threshold.

9. The apparatus of claim 7, further comprising:
means for receiving from the access network a message to switch to a second carrier; and
means for switching from the first carrier to the second carrier in response to the message.

10. The method of claim 1, wherein the switch threshold is a first switch threshold, for a first carrier among multiple carriers having different transmit power levels, and wherein the method further comprises:
receiving from the access network, for a plurality of other carriers among the multiple carriers, a corresponding plurality of different switch thresholds, each corresponding to a different carrier among the plurality of other carriers.

11. The method of claim 10, further comprising setting a default switch threshold for a carrier among the multiple carriers not having a corresponding received switch threshold.

12. An apparatus for wireless communication, comprising:
at least one processor configured to receive a switch threshold from an access network, to measure received signal strength of a first carrier among multiple carriers having different transmit power levels, to compare the received signal strength of the first carrier against the switch threshold, to determine a difference between the received signal strength of the first carrier and received signal strength of a stronger carrier if the received signal strength of the first carrier is below the switch threshold, to switch from the first carrier to the stronger carrier if the difference exceeds a delta threshold, and to refrain from switching to the stronger carrier if the received signal strength of the first carrier exceeds the switch threshold.

13. The apparatus of claim 12, wherein the switch threshold is a first switch threshold, for a first carrier among multiple carriers having different transmit power levels, and wherein the at least one processor is further configured to receive from the access network a plurality of different other switch thresholds, each of the other switch thresholds corresponding to a different carrier among other of the multiple carriers.

14. The apparatus of claim 13, further configured to set a default switch threshold for a carrier among the multiple carriers not having a corresponding received switch threshold.

15. An apparatus for wireless communication, comprising:
means for receiving a switch threshold from an access network;
means for measuring received signal strength of a first carrier among multiple carriers having different transmit power levels;
means for comparing the received signal strength of the first carrier against the switch threshold;
means for determining a difference between the received signal strength of the first carrier and received signal strength of a stronger carrier if the received signal strength of the first carrier is below the switch threshold;
means for switching from the first carrier to the stronger carrier if the difference exceeds a delta threshold; and
means for refraining from switching to the stronger carrier if the received signal strength of the first carrier exceeds the switch threshold.

16. The apparatus of claim 15, wherein the switch threshold is a first switch threshold, for a first carrier among multiple carriers having different transmit power levels, and wherein the apparatus further comprises means for receiving from the access network, for a plurality of other carriers among the multiple carriers, a corresponding plurality of different switch thresholds, each corresponding to a different carrier among the multiple carriers.

17. The apparatus of claim 16 further comprising means for setting a default switch threshold for a carrier among the multiple carriers not having a corresponding received switch threshold.

18. A non-transitory computer-readable medium comprising:
 code for causing at least one computer to receive a switch threshold from an access network;
 code for causing the at least one computer to measure received signal strength of a first carrier among multiple carriers having different transmit power levels;
 code for causing the at least one computer to compare the received signal strength of the first carrier against the switch threshold;
 code for causing the at least one computer to determine a difference between the received signal strength of the first carrier and received signal strength of a stronger carrier if the received signal strength of the first carrier is below the switch threshold;
 code for causing the at least one computer to switch from the first carrier to the stronger carrier if the difference exceeds a delta threshold; and
 code for causing the at least one computer to refrain from switching to the stronger carrier if the received signal strength of the first carrier exceeds the switch threshold.

19. The non-transitory computer-readable medium of claim 18, further comprising:
 code for causing the at least one computer to remain on the first carrier, even when the stronger carrier is present, if the received signal strength of the first carrier exceeds the switch threshold.

20. The non-transitory computer-readable medium of claim 18, further comprising:
 code for causing the at least one computer to receive from the access network a message to switch to a second carrier; and
 code for causing the at least one computer to switch from the first carrier to the second carrier in response to the message.

21. The method of claim 20, further comprising:
 setting the switch threshold based on quality of service (QoS) requirements of terminals.

22. The method of claim 20, wherein the switch threshold is used to prevent the terminal from switching to the stronger carrier when the first carrier can provide satisfactory performance.

23. The method of claim 22, further comprising:
 moving the terminal from the first carrier to the second carrier to balance load among the multiple carriers or to meet quality of service for the terminal.

24. The method of claim 20, further comprising:
 sending to the terminal a message to switch to a second carrier; and
 switching the terminal from the first carrier to the second carrier.

25. The method or claim 20, further comprising:
 assigning the terminal to the first carrier during system access or handoff.

26. The apparatus of claim 25, wherein the at least one processor is configured to set the switch threshold based on quality of service (QoS) requirements of terminals.

27. The apparatus of claim 26, wherein the at least one processor is configured to move the terminal from the first carrier to the second carrier to balance load among the multiple carriers or to meet quality of service for the terminal.

28. The apparatus of claim 25, wherein the at least one processor is configured to send to the terminal a message to switch to a second carrier, and to switch the terminal from the first carrier to the second carrier.

29. The non-transitory computer-readable medium of claim 18, wherein the switch threshold is a first switch threshold, for a first carrier among multiple carriers having different transmit power levels, and wherein the non-transitory computer-readable medium further comprises code for causing the computer to for receive from the access network, for a plurality of other carriers among the multiple carriers, a corresponding plurality of different switch thresholds, each corresponding to a different carrier among the multiple carriers.

30. The non-transitor computer-readable medium of claim 29, further comprising code for causing the at least one computer to set a default switch threshold for a carrier among the multiple carriers not having a corresponding received switch threshold.

31. A method of supporting carrier switching, comprising:
 sending a switch threshold;
 receiving signaling from the terminal to switch from a first carrier to a stronger carrier among multiple carriers having different transmit power levels, the switch being initiated by the terminal only if received signal strength of the first carrier is below the switch threshold concurrent with a difference between received signal strength of the first carrier and received signal strength of the stronger carrier exceeding a given delta threshold and
 switching the terminal from the first carrier to the stronger carrier in response to the signaling from the terminal.

32. The method of claim 31, wherein the switch threshold is a first switch threshold, for a first carrier among multiple carriers having different transmit power levels, and wherein the method further comprises: sending a plurality of other switch thresholds to the terminal, each of the plurality of other switch thresholds corresponding to a different carrier among the multiple carriers.

33. The method of claim 32, further comprising setting at least one of the plurality of other switch thresholds based on quality of service (QoS) requirements of terminals.

34. An apparatus for wireless communication, comprising:
 at least one processor configured to send a switch threshold to a terminal, to receive signaling from the terminal to switch from a first carrier to a stronger carrier among multiple carriers having different transmit power levels, the switch being initiated by the terminal only if received signal strength of the first carrier is below the switch threshold concurrent with a difference between received signal strength of the first carrier and received signal strength of the stronger carrier exceeding a given delta threshold, and to switch the terminal from the first carrier to the stronger carrier in response to the signaling from the terminal.

35. The apparatus of claim 34, wherein the switch threshold is a first switch threshold, for a first carrier among multiple carriers having different transmit power levels, and wherein the at least one processor is further configured to send to the terminal a plurality of different switch thresholds, each corresponding to a different carrier among the multiple carriers.

36. The apparatus of claim 35, wherein the at least one processor is further configured to set at least one of the plurality of other switch thresholds based on quality of service (QoS) requirements of terminals.

* * * * *